Inventor
Howard N. Arnold

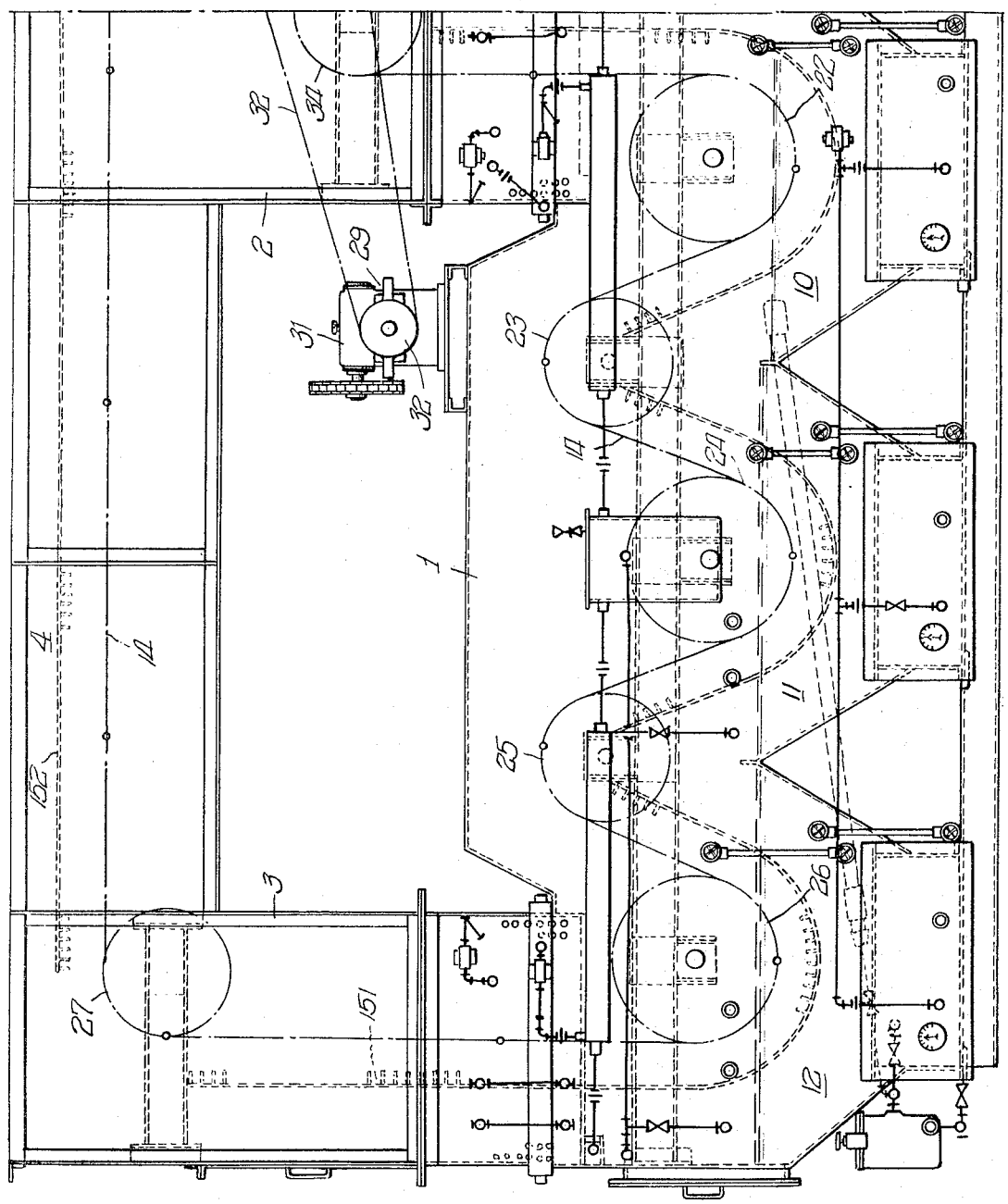

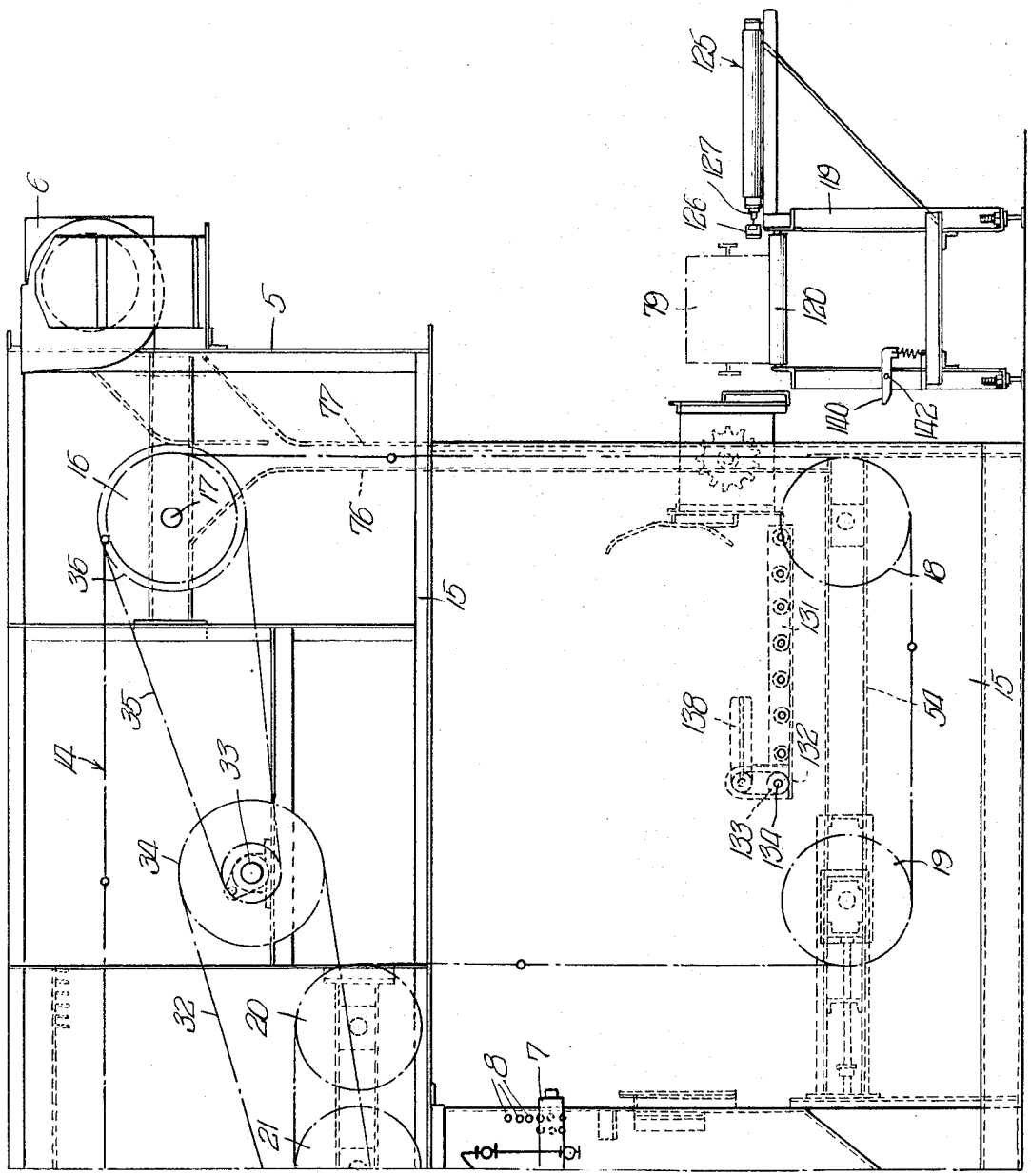

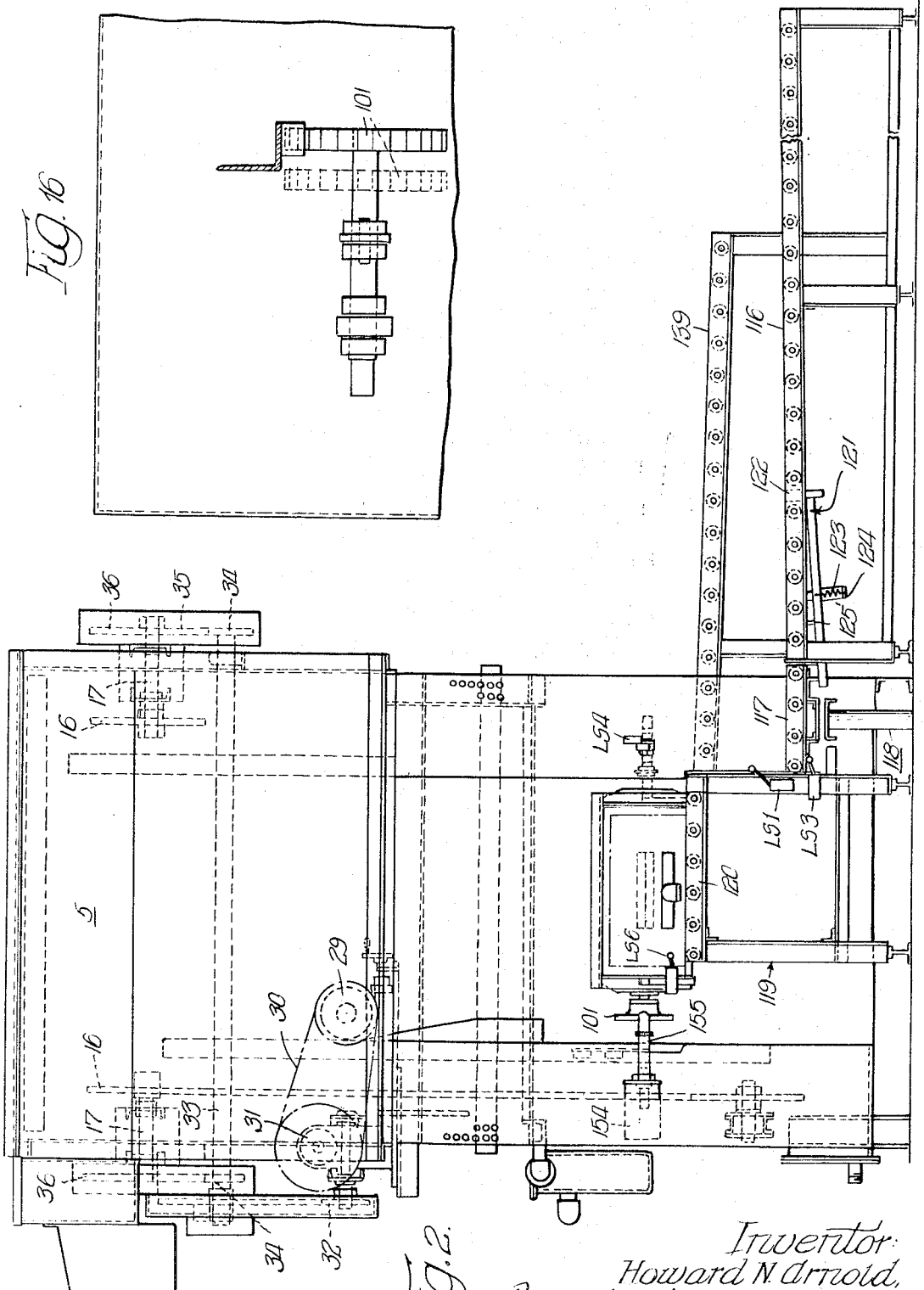

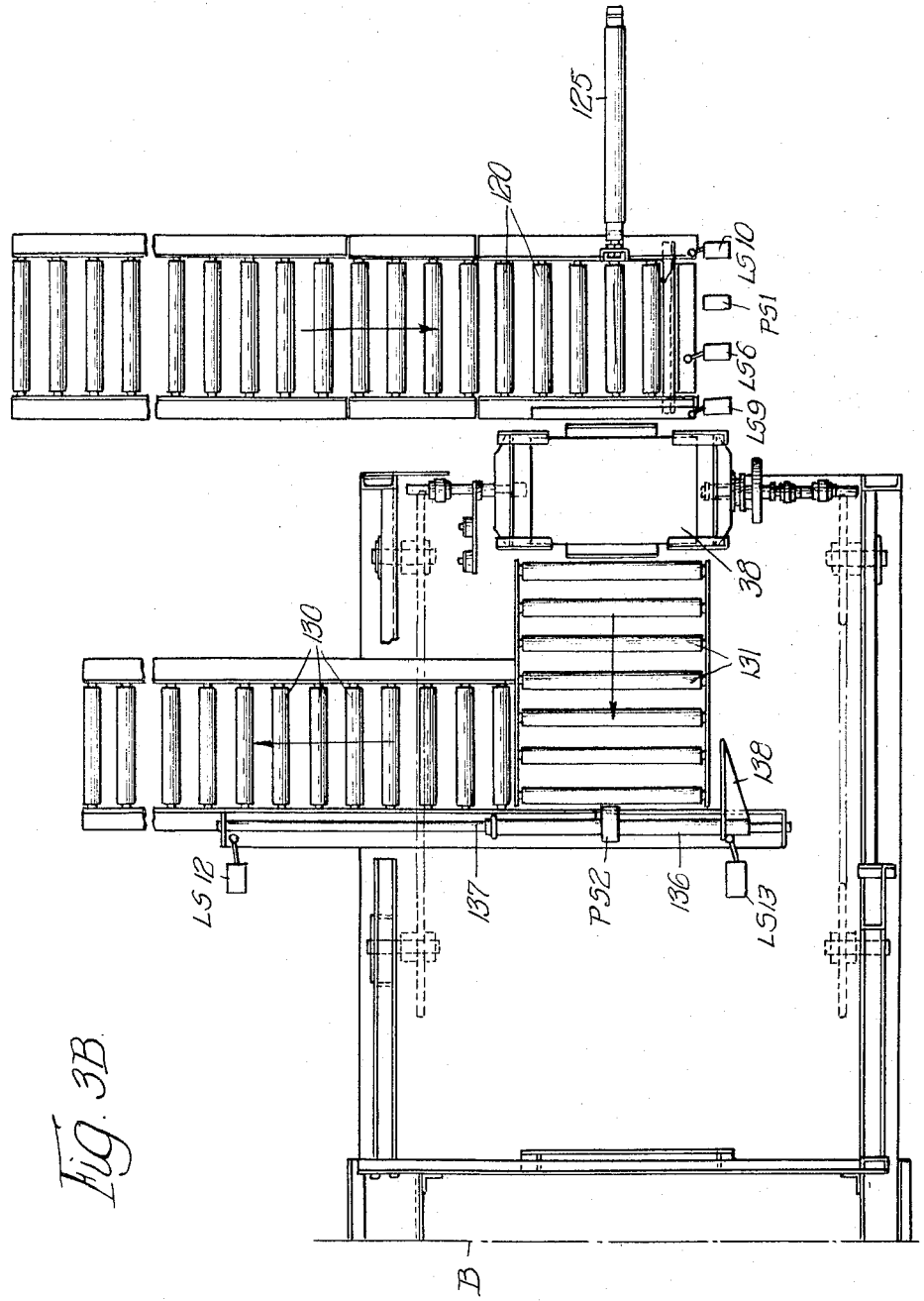

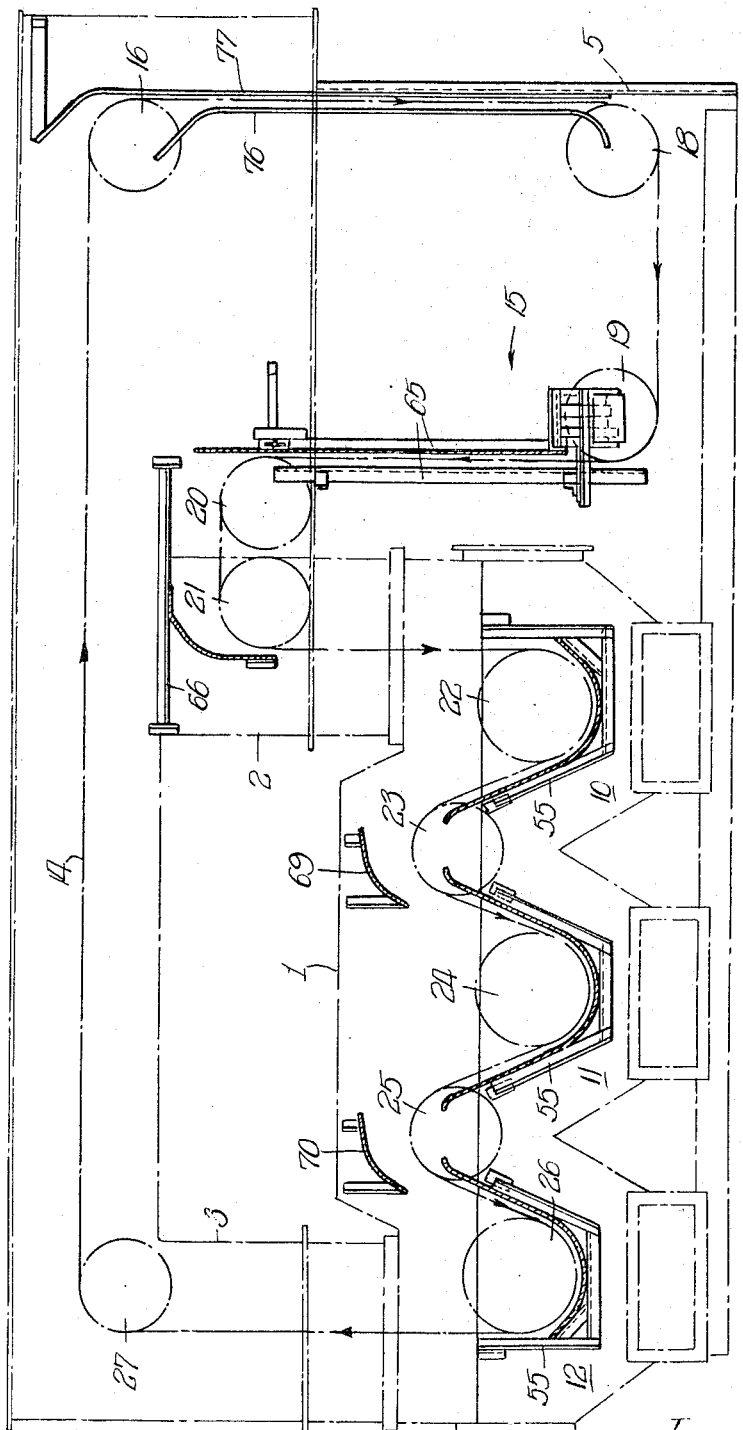

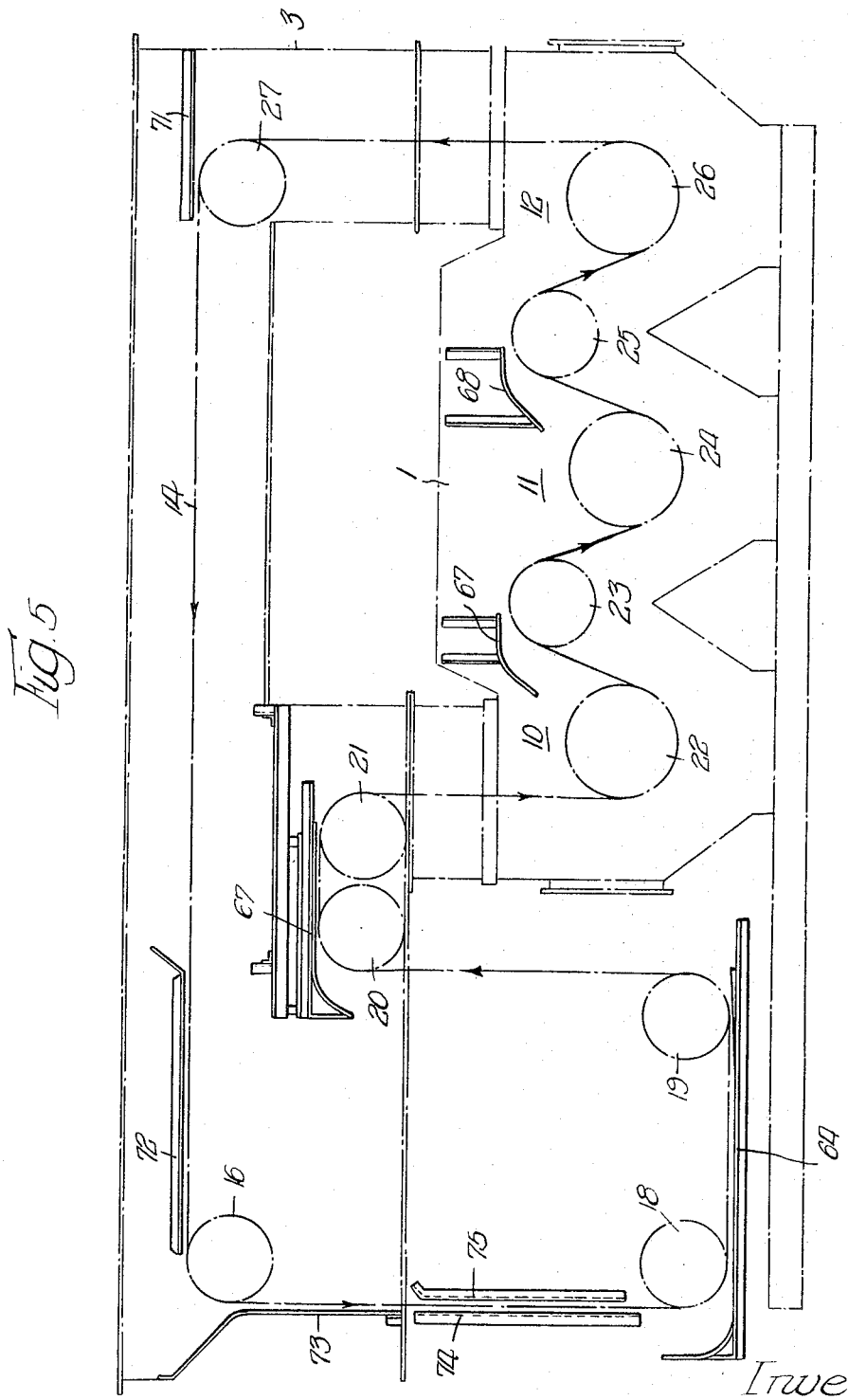

Inventor:
Howard N Arnold

March 14, 1967  H. N. ARNOLD  3,308,920
DEGREASER WITH OPTIONALLY ROTARY AND NON-ROTARY CONTAINERS
Filed May 4, 1965  12 Sheets-Sheet 10
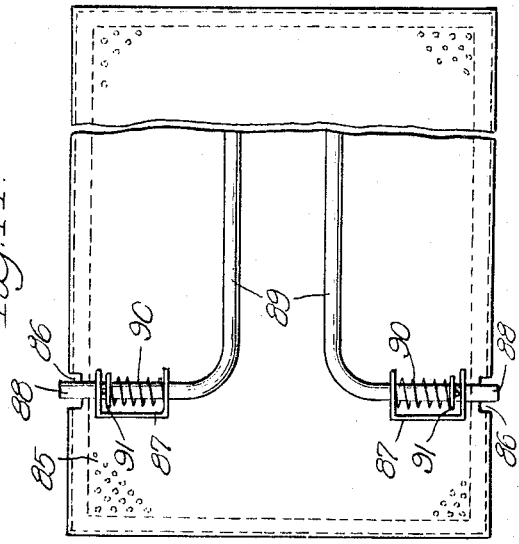
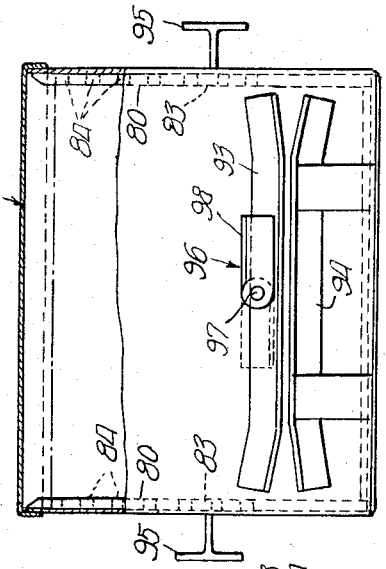
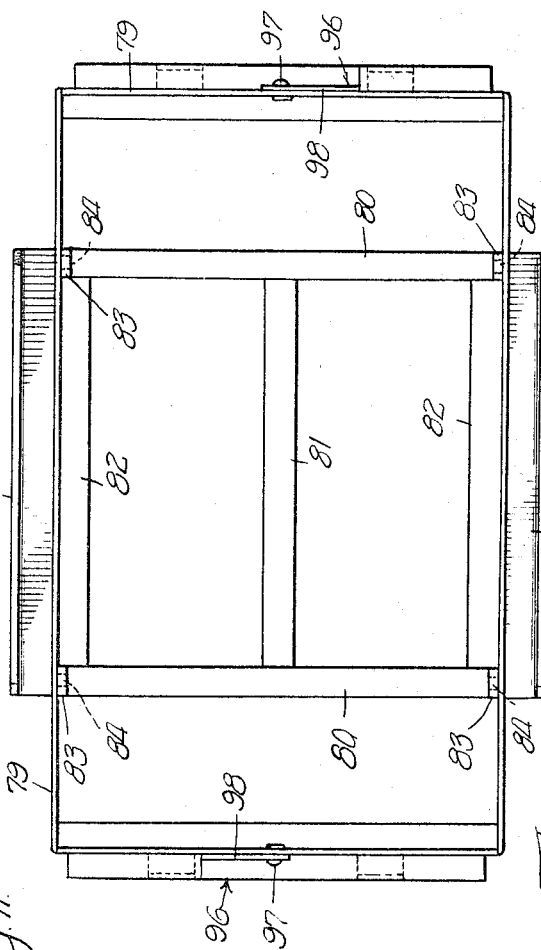
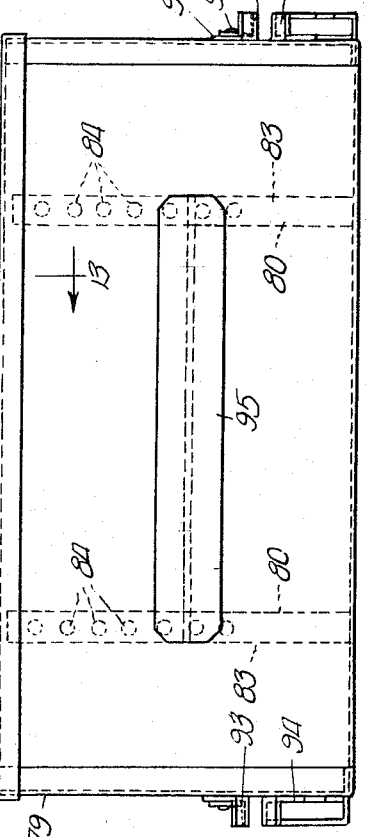
Inventor
Howard N. Arnold,
Brown, Jackson, Boettcher & Dienner attys

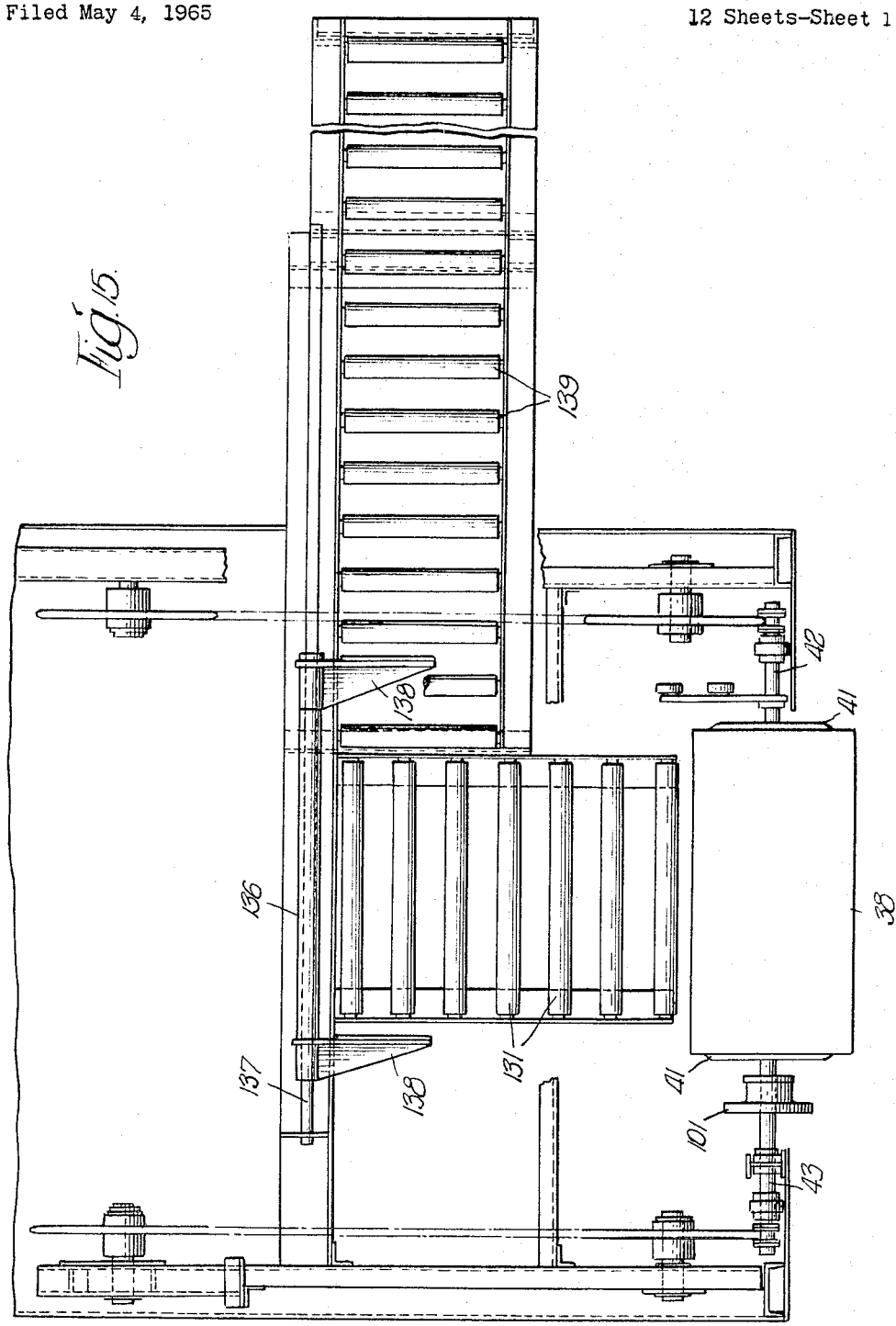

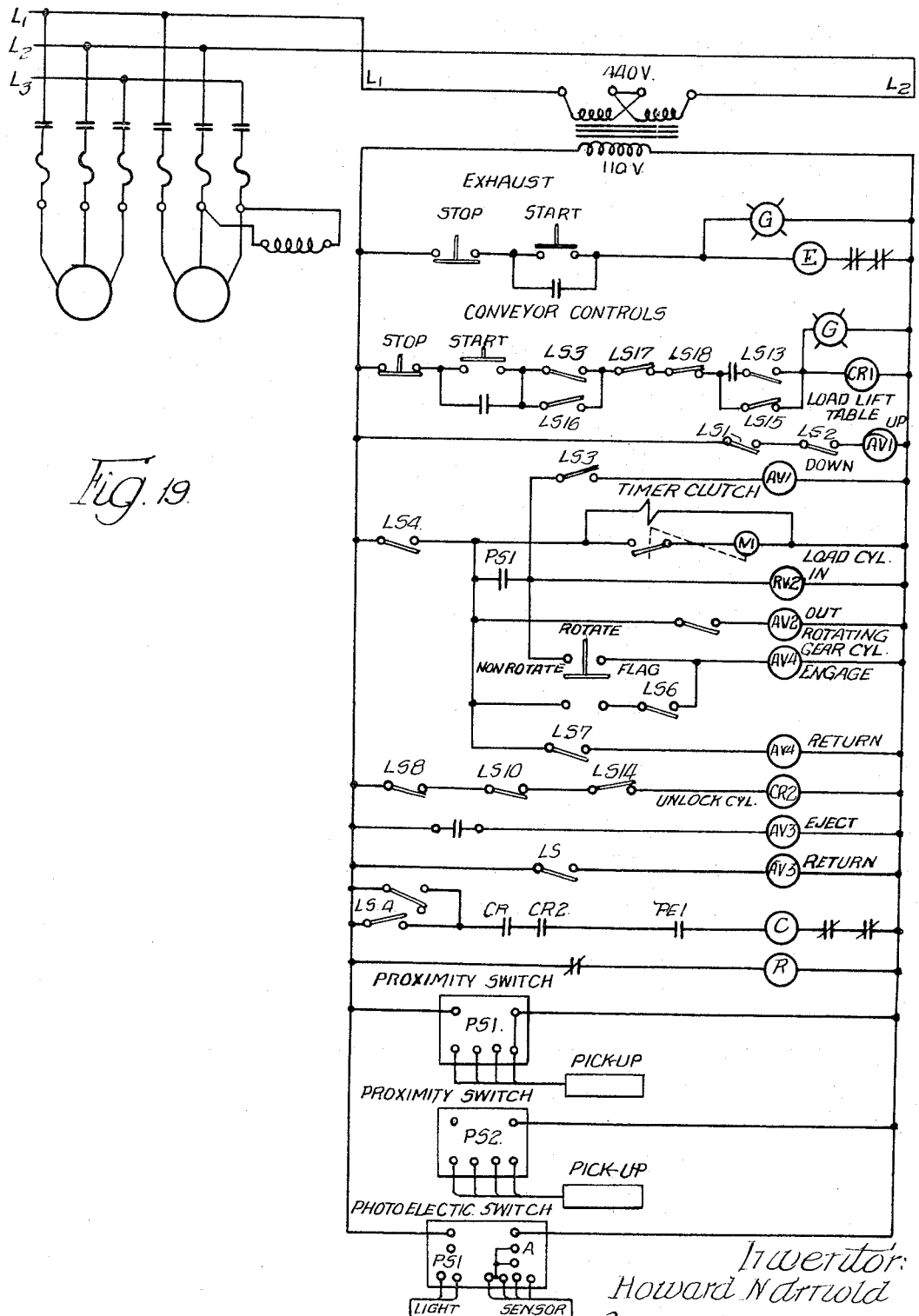

United States Patent Office 3,308,920
Patented Mar. 14, 1967

3,308,920
DEGREASER WITH OPTIONALLY ROTARY AND NON-ROTARY CONTAINERS
Howard N. Arnold, Western Springs, Ill., assignor to Baron-Blakeslee, Incorporated, Cicero, Ill., a corporation of Illinois
Filed May 4, 1965, Ser. No. 453,166
7 Claims. (Cl. 198—19)

This invention relates to machines, frequently termed degreasers, for removing grease and other foreign substances from parts or articles of various sizes and shapes.

It is known to degrease articles by subjecting them to a bath of a hot chlorinated hydrocarbon solvent, such as as trichloroethylene. In some of the known degreasers the parts are placed in a suitable container and are passed through a trichloroethylene bath heated to its boiling point at atmospheric pressure, without the container being rotated. In certain other known degreasers, the parts are placed in containers which are rotated to assure adequate contact thereof with the solvent. That is desirable if the parts or articles are comparatively small or have hollows or depressions from which the solvent will not readily drain unless the position of the parts or articles is changed, as by rotating the container. Under the present practice referred to to employ two degreasers—one for parts from which the solvent will readily drain without changing the position of such parts and one for parts which are comparatively small or which require change in position to assure drainage of the solvent.

My invention is directed to a degreaser which is adapted to treat both articles which do not require change in position during treatment and parts which do require change in position during treatment, thus fulfilling all of the functions of two degreasers required under the present practice. More particularly, I provide baskets or containers for the particles carried by a conveyor travelling through the degreaser and means whereby the baskets may be rotated or restrained against rotation, as desired, during their travel with the conveyor. A further object of my invention is to provide a degreaser which is automatic in operation. Further objects and advantages of my invention will appear from the detail description.

In the drawings:

FIGURES 1A and 1B are fragmentary side views which when line A of FIGURE 1A is placed on line B of FIGURE 1B form a side view of a degreasing machine according to the present invention;

FIGURE 2 is a front end view of the machine shown in FIGURES 1A and 1B;

FIGURES 3A and 3B are fragmentary plan views which when line A of FIGURE 3A is placed on line B of FIGURE 3B form a plan view of the machine shown in FIGURES 1A and 1B;

FIGURE 4 is a fragmentary left elevation showing the leveling guides for the rotating fixture;

FIGURE 5 is a fragmentary right elevation showing the leveling guides on that side for the rotating fixture;

FIGURE 11 is a top plan view of one of the baskets;

FIGURE 12 is a side view of the basket shown in FIGURE 11;

FIGURE 13 is a vertical sectional view through the basket taken generally along the line 13—13 of FIGURE 12;

FIGURE 14 is a fragmentary top view showing the basket cover detail;

FIGURE 15 is a fragmentary top plan view showing the air operated unloader;

FIGURE 16 is a detail view showing the location of the rotating gear rack in the hood;

FIGURE 19 is an elementary circuit diagram showing the panel layout, the electrical parts and the sequence of operation.

Figure 18:
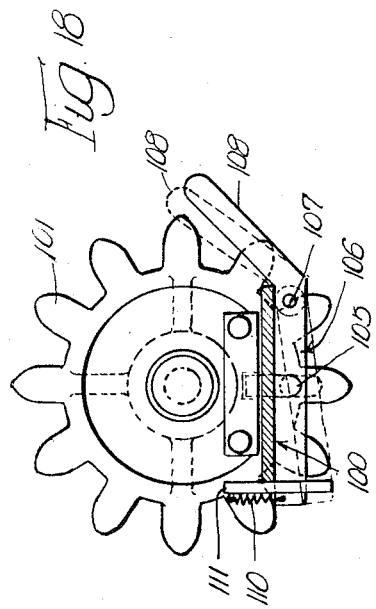
FIGURES 17 and 18 are views showing the sliding gear assembly.

The degreaser of my invention comprises a main housing 1 into which open front and rear stacks 2 and 3, respectively, connected at their upper ends by a tunnel 4. A supplementary housing 5 extends forwardly from stack 2 and carries at its front an exhaust blower unit 6 for taking off solvent vapor which may escape from the interior of the machine. Each of the stacks 2 and 3 is provided with an exterior cooling jacket 7 and an interior cooling coil 8 for condensing the solvent vapor and preventing escape thereof to atmosphere, as is known. The machine is also provided with various other known accessories such as a water separator, solvent coolers, steam coils for heating the solvent in the sumps, to be referred to later, etc., which are well known and need not be described in detail.

The lower portion of housing 1 is constructed to provide three adjacent sumps 10, 11 and 12 each of which contains a body of a volatile solvent, such as trichloroethylene, which is heated to its boiling point at atmospheric pressure by steam coils (not shown) in the bottom of the respective sumps.

An endless chain conveyor 14 extends from the supplementary housing 5 downward to a forward extension 15 of housing 1 and thence rearward through the sumps 10, 11 and 12, upward through the rear stack 3 and then forward through tunnel 4 and the forward stack 2 to the supplementary housing 5. The side chains of conveyor 14 pass over sprockets 16 secured on the inner ends of stub shafts 17 rotatably mounted through the side walls of the supplementary housing 5. From the sprockets 16 the conveyor side chains pass downward about sprockets 18 and 19 rotatably mounted in housing extension 15 adjacent the sides thereof. From the sprockets 19 the conveyor chains pass upward and over a pair of sprockets 20 and 21 rotatably mounted in stack 2 adjacent each side thereof. From the sprockets 21 the conveyor chains are led downward about sprockets 22 in sump 10 thence upward over sprockets 23 above and between sumps 10 and 11, then downward about sprockets 24 in sump 11 from the latter sprockets over sprockets 25 above and between sumps 11 and 12 and from sprockets 25 downward about sprockets 26 in sump 12. From the sprockets 26 the conveyor chains are led upward about sprockets 27 in stack 3 adjacent the side thereof and thence forward to tunnel 4, the stack 2 and supplementary housing 5 to the sprockets 16.

The conveyor is driven by an electric motor 29 mounted on the top of housing 1. The motor 29 has belt and pulley drive 30 to the input shaft of a speed reducing unit 31 the output shaft of which has chain and sprocket drive 32 to a countershaft 33 rotatably mounted in the housing extension 5. Sprockets 34, secured on countershaft 33 adjacent the ends thereof and exterior of the supplementary housing 5, have driving connection by chains 35 to sprockets 36 secured on the outer ends of the stub shafts 17 and exterior of the supplementary housing 5. The direction of drive is such that the lower run of the conveyor travels rearward through housing extension 15 and main housing 5, the conveyor traveling upward from sump 12 and thence forward to the sprockets 36, as indicated in FIGURE 1B. The idler sprockets about which the conveyor chains pass are rotatably mounted adjacent the sides of the housing extension 15, housing 1, stack 2, tunnel 4, stack 2 and supplementary housing 5, as will be understood from what has been said. The speed reducing unit 31 is provided with solenoid brake means referred to more fully later, which cooperate with control means, also to be referred to more fully later, providing for intermittent or step-by-step operation of the conveyor.

Figure 7:
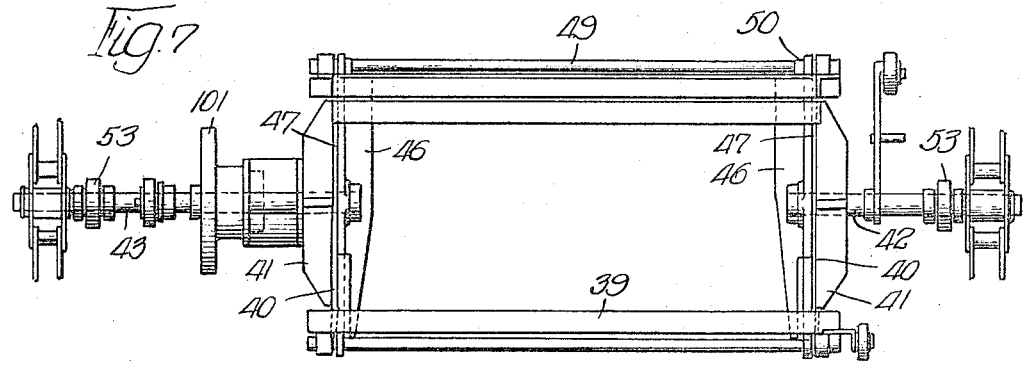
FIGURE 7 is a plan view of the rotating fixture.
Figure 6:
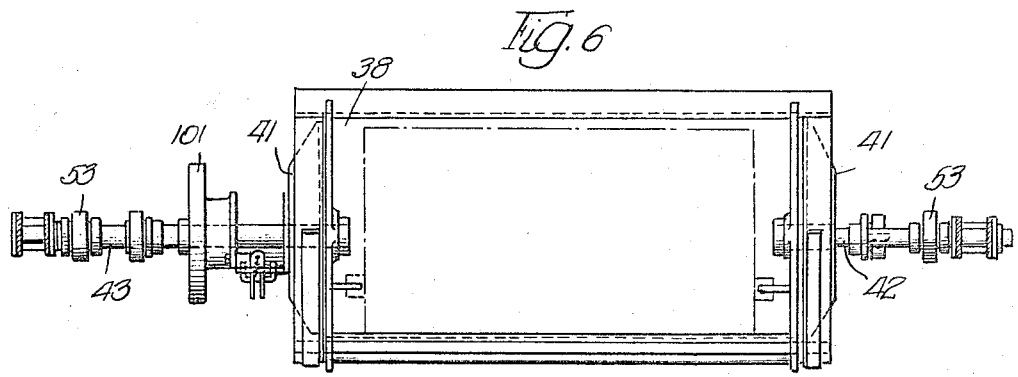
FIGURE 6 is a side view of the rotating fixture.
Figure 8:
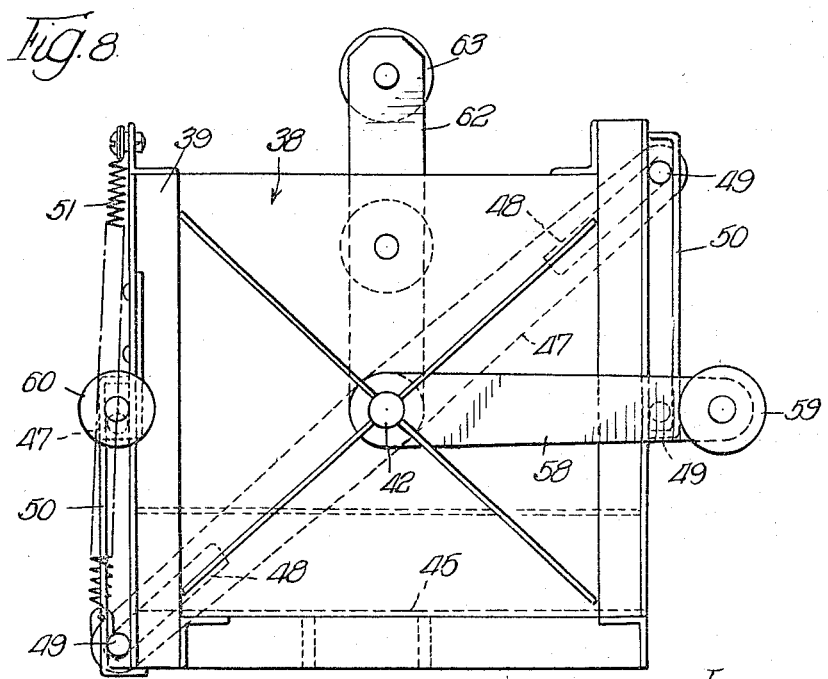
FIGURE 8 is an end view of the rotating fixture.

The conveyor carries a plurality of carrying frames or cages rotatably mounted thereon, the axes of rotation of which are indicated by the solid circles in FIGURE 1A. Referring to FIGURES 6 to 8, each of the cages 38 is of box-like form, of rectangular cross section both vertically and horizontally. The cage comprises an angle iron frame 39 closed at each end by the rectangular end plate 40 to the outer face of which is secured a reinforcing and mounting spider 41. A stub shaft 42 is fixed in the spider 41 at the right end of cage 38, as viewed from in front. A stub shaft 43 is fixed in the spider at the left end of cage 38 and is of somewhat greater length than the stub shaft 42. The stub shafts 42 and 43 are rotatably mounted in opposed links of the conveyor chains, the cage being disposed somewhat closer to the right hand chain than the left hand chain due to the difference in length of the stub shaft, as will be understood, as shown in FIGURE 7.

Figure 9:
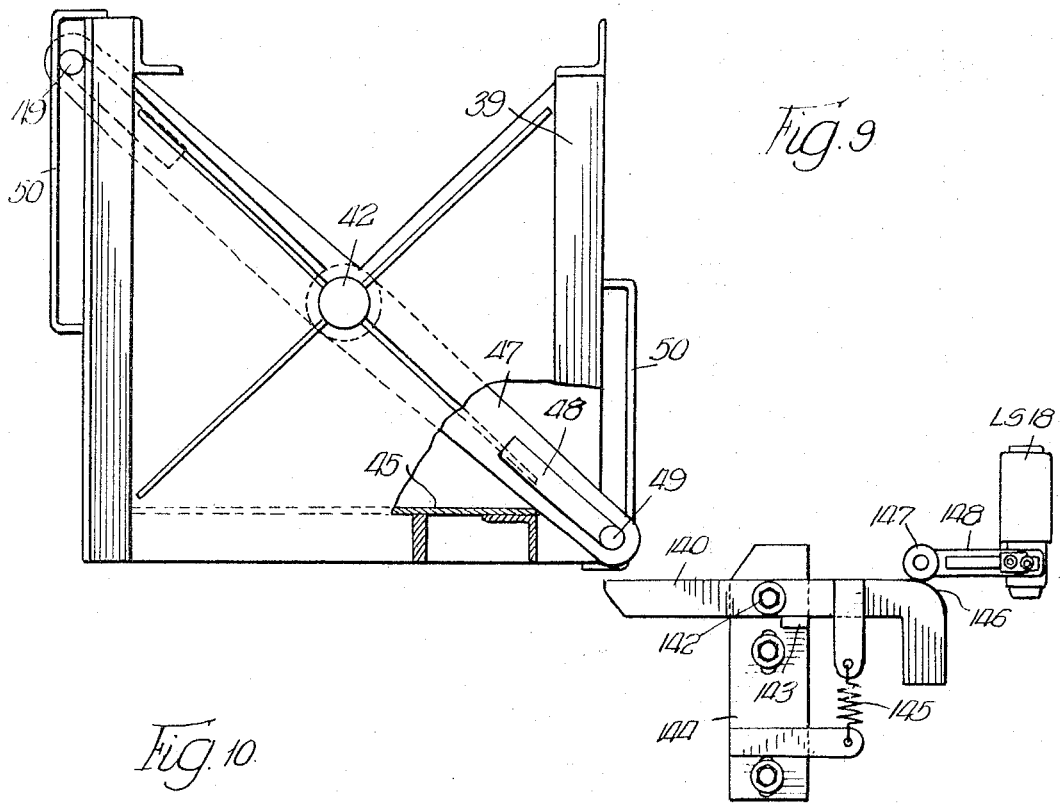
FIGURE 9 is a view showing the safety lock arm assembly for preventing the fixture from entering the machine if the basket is not locked into the fixture.
Figure 10:
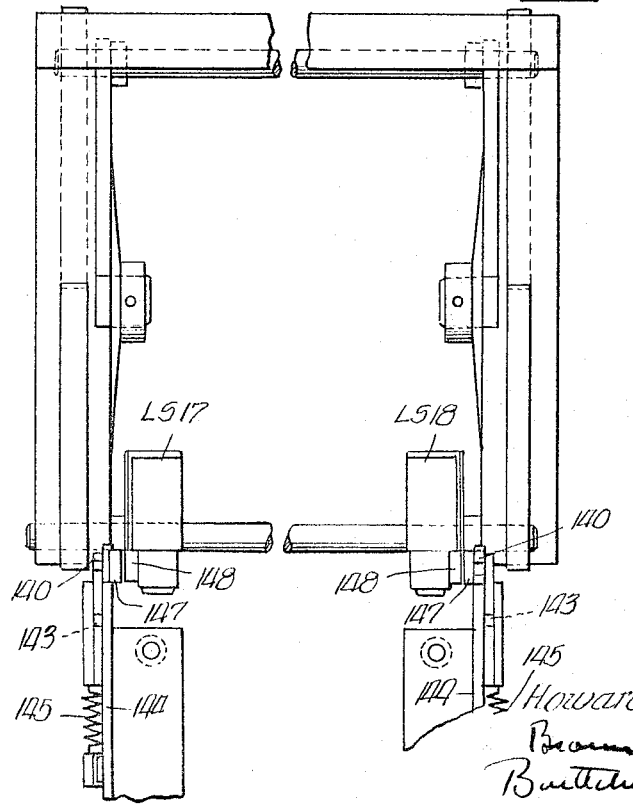
FIGURE 10 is an end view of the rotating fixture assembly.

The cage 38 is provided in its lower portion, as viewed in its normal upright leading position, with a floor or platform 45 for reception of a container or basket to be referred to more fully later. Basket guiding and locating strips 46 having the inner edges of their forward portions inclined outwardly and forwardly are secured to the inner faces of the end plates 40 and assist in properly locating a basket pushed into the cage from the front thereof, as will be explained more fully in connection with the baskets. A locking arm 47 is rockably mounted on each of the stub shafts 42 and 43 at the inner face of end plate 40. The arms 47 are provided at each end portion thereof with an elongated slot 48 which slots receive locking rods 49 restrained against endwise movement by stop collars 50 secured thereon at the inner faces of the arms 47. The rods 49 extend beyond arms 47 through guide members or keeps 50 secured to cage 38 and effective for restraining rods 49 against outward movement away from the cage. In FIGURE 9 the arms 47 are shown in their basket releasing position in which they are held during a loading operation, as will be explained more fully later. Tension springs 51 are anchored at their upper ends to the top of the cage 38 and at their lower ends to the forward ends of the locking arms 47. When the arms 47 pass beyond cam means holding them in their position shown in FIGURE 9, they are turned to substantially horizontal position by the tension springs 51, moving the locking rods 47 to their broken line positions indicated, effective for locking a basket in the cage 38, as will be explained more fully later.

A load supporting roller 53 is rotatably mounted on each of the stub shafts 42 and 43. During travel of a cage to the first sump 10 the rollers travel on lower horizontal track sections 54 mounted in the housing extension 15 adjacent the sides thereof. The cage then travels upward about the sprockets 20 and 21 and thence downward to the first sump 10. During travel of the cage through the sumps, the supporting rollers travel on track sections of substantially U-shaped disposed at the sides of the respective sumps. The cage then passes upwardly from the last sump 12 and then forwardly to the sprockets 16. During such forward travel of the cage the rollers 53 travel upon upper horizontal track section 56 extending through tunnel 4, stack 2 and supplementary housing 5, at the sides thereof.

An arm 58 is fixed on stub shaft 42 at the right side of cage 38 and extends a short distance rearwardly thereof in a horizontal plane passing through the axis of stub shaft 42. A positioning roller 59 is rotatably mounted on the rearward end of arm 58, the latter being spaced a short distance away from the end of cage 38. A second roller 60 is rotatably mounted on a bracket 61 secured to the end of cage 38 and is spaced a less distance from the end of the cage than the roller 59. A vertical arm 62 is fixed on stub shaft 43 and is spaced a substantial distance from and extends above the left end of cage 38. A positioning roller 63 is rotatably mounted on the upper end of arm 62. As the cage starts its rearward travel to the first sump 10, the rollers 59 and 60 contact guide rails 64 mounted on the right side of housing extension 15 and spaced inwardly from the load supporting tack or rail. The rollers 59 and 60 are then effective, in conjunction with arm 58, for holding the cage in upright position. When the cage starts its upward travel to the sprocket 20, roller 63 at the upper end of arm 62 enters between two vertical guide rails 65 mounted in housing extension 15 at the left side thereof and spaced inwardly from the load supporting rail as shown in FIGURE 4. The roller 63 is then effective, in cooperation with arm 62 for maintaining the cage in upright position as it travels upward to the sprockets 20. As the cage starts about the sprockets 20 the roller 63 contacts guide means 66 having a horizontal portion and a rearward portion overlying and extending about the sprockets 20 and 21, the arm 62 having then passed upward from between the guide rails 65. At the same time, the rollers 59 and 60 contact guide rail structure 67 adjacent the right side of the housing overlying and extending in part about the sprockets 20 and 21. The cage is thus held in upright position during its travel to and about the sprockets 20 and 21. During travel of the cage from the first sump 10 to the second sump 11 and from the latter sump to the third sump 12, the rollers 59 and 60 contact arcuate guide members 67 and 68 adjacent the right side of housing 1 and roller 63 contacts guide members 69 and 70 adjacent the left side of housing 15. In that manner objectionable swinging or swaying of the cage is prevented and assurance is had that the cage is in substantially upright position as it enters each of the sumps in succession, while also assuring that it is in substantially upright position as it leaves the last sump 12. The cage, in substantially upright position, travels upward from the sprockets 26 to the sprockets 27. As it starts about the latter sprockets the rollers 59 and 60 contact a horizontal guide rail 71 (FIGURE 5) in stack 3, adjacent the right hand side thereof, thereby assuring that the cage is in upright position as it passes onto the upper load supporting track sections 56. The cage then travels forwardly along the upper load supporting track sections to the sprockets 16. Shortly before it reaches the latter sprockets roller 59 contact a horizontal guide rail 72 spaced inwardly from the right side of the supplementary housing 5, effective for holding the cage in upright position. From the sprockets 16 the cage passes downward to a load-unload station to be referred to more fully later. As the cage passes downward the right load supporting roller 53 contacts a guide member 73 from which it passes between two vertical guide rails 74 and 75. Also, as the cage starts downward from the sprockets 16 the roller 63 at the upper end of arm 62 passes between two vertical guide rails 76 and 77 mounted in the supplementary housing 5 and the housing extension 15 adjacent the left side thereof. Assurance is thus had that the cage will be in upright position when it arrives at the load-unload station referred to above.

One of the baskets or containers for the articles being treated is shown more clearly in FIGURES 11 through 14. The basket 79 is of box-like form, of rectangular section in plan and has perforated side and end walls. It is reinforced by interior U-shaped members 80 secured to the front and back walls and the bottom wall thereof, such members being connected by a central reinforcing member 81 and side reinforcing members 82 secured thereto and to the bottom wall of the basket. The arms of the members 80 provide vertical locking arms 83 secured to the side walls of the basket. The arms 83 are provided with equally spaced openings 84. A perforated flat cover or closure member, dimensioned to fit snugly within the basket 79, is provided. The closure member 85 is provided at the sides thereof with notches disposed to receive the arms 83. U-shaped brackets 87 are suitably secured, conveniently by welding, to the upper face of the closure member 85. The brackets 87 are aligned with notches 86 and slidably receive locking fingers 88 at the ends of handles 89 of elongated U-shape. The fingers 88 are urged outwardly of closure member 85 by compression springs 90 confined between the inner arms of brackets 87 and abutment members or washers 91 mounted on fingers 88 and restrained against outward movement therealong by cotter pins.

In placing the closure member 85 in the basket 79 the handles 89 are forced toward each other thus retracting the fingers 88 so that the closure member may be disposed at the desired height within the basket. When the closure member is properly positioned the handles 89 are released and the fingers 88 enter aligned openings or recesses 84 in the arms 83 thus locking the closure member in adjustment.

Two vertically spaced positioning and guide strips of angle cross section, comprising an upper strip 93 and a lower strip 94 (FIGURE 13) are suitably secured, conveniently by welding, to each end of basket 79 a short distance from the bottom thereof. The end portions of the strips 93 and 94 are bent away from each other to provide inwardly converging passages opening into a main passage between the body portions of the strips. The basket is further provided, at about the mid-height of each side wall thereof, with a bar 95 of T-shape in cross section welded thereto with the head of the T spaced away from the wall of the basket. A selector member 96 of angle cross section is pivoted at one end, at 97, on the upper strip 93 centrally of each end wall of the basket. The member 96 is of angle cross section and may be turned to either of two positions—a rotate position and a non-rotate position. In the latter position of member 96 its vertical arm rests upon the horizontal flange of strip 93 with its horizontal arm spaced above that strip, and in its rotate position the horizontal arm of member 96 rests upon the flange of strip 93 with the vertical arm extending thereabove. The horizontal flange of member 96 is beveled at its outer portion, at 98. When the member 96 is in non-rotate position the horizontal flange thereof is disposed above strip 93 and actuates a limit switch as the loaded basket is pushed into a cage stopped at the load-unload position previously mentioned.

Figure 17:
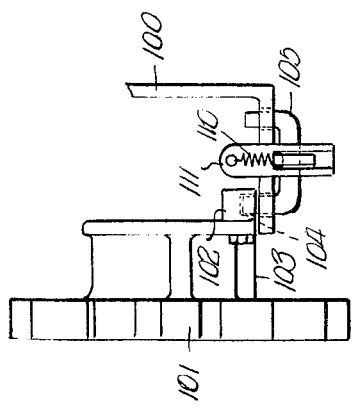
Figure 3A:
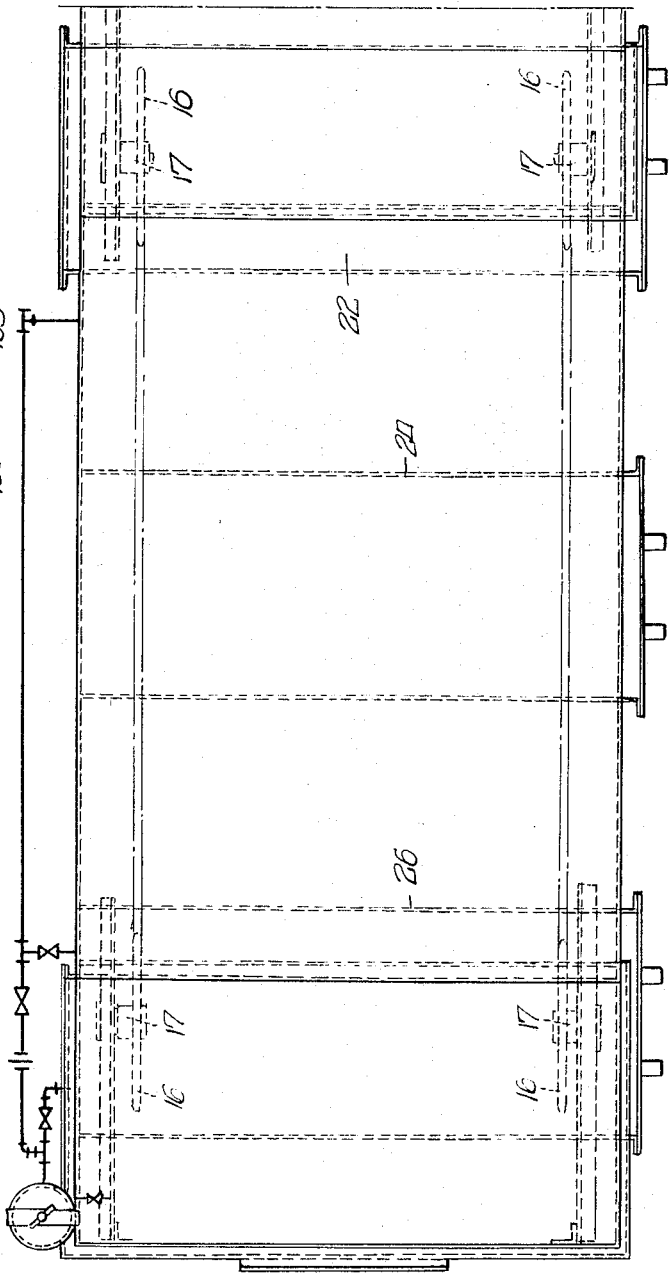

Referring further to FIGURES 16, 17 and 18, an angle bracket 100 is fixed to the spider 41 at the left end or side of cage 38. A cage rotating gear 101, disposed between arm 62 and bracket 100, is splined on stub shaft 43 for sliding movement toward and away from bracket 100. A latching block 102 is bolted to the inner end of hub 103 of gear 101. Block 102 is provided in its undersurface with a recess 104 for reception of the outer arm of a U-shaped latch member 105 underlying the horizontal flange of bracket 100, which flange is provided with two space openings through which the arms of member 105 project. The latch member 105 is secured in the outer arm of a latch lever 106 pivoted at 107 to the horizontal flange of bracket 100. The other arm 108 of lever 106 extends at an angle upward and rearward and is disposed to contact a cam 109 disposed at the left side of housing extension 15 at the load-unload station. As the cage approaches load-unload position arm 108 contacts cam 109, which swings the other arm of lever 106 downward in opposition to a tension spring 110 anchored at its lower end to the forward end of lever 106 and at its upper end to a plate 111, slotted at its lower portion for reception of the forward end of lever 106, such plate being welded to the forward edge of the horizontal arm of bracket 100. If the gear 101 is in its outer non-rotate position when the cage reaches load-unload position it is moved to an inner rotate position, shortly after the unlatching operation, by a second cam 112 at the left of the housing extension 5. Thereafter the latch member 105 is held in unlatching position by cam 109 so long as the cage remains at load-unload position.

As the cage reaches load-unload position it closes one contact of a limit switch LS4, disposed adjacent the vertical guide rail 75 and having an operating member extending through an opening in that rail and actuated by the right hand load supporting roller 53. Actuation of the switch LS4 is effective for opening the motor circuit and applying a solenoid brake to the speed reducing unit 31, while also starting a dwell timer, as will appear more fully later in connection with the circuitry diagram of FIGURE 19. Further, as the cage approaches load-unload position the rearward ends of the locking arms 47, then held in horizontal position by the tension springs 51, contact suitably shaped cams 114 disposed a short distance rearwardly of the vertical guide rails 75 and 76. The cams 114 are effective for turning the locking arms 47 to their position shown in FIGURE 9 and holding them in such position so long as cage remains at the load-unload station. The locking bars 49 are then held in upper and lower positions clear of the front and the rear openings of the cage.

The loaded baskets are placed upon a roller conveyor 116 (FIGURE 2) inclined downwardly toward a similarly inclined roller table 117 of an air operated elevator 118. In the lowered position of the elevator 118 table 117 thereof holds closed one contact of a limit switch LS3, it being noted that this switch and the limit switch LS4 are two contact switches. Referring further to the circuitry diagram (FIGURE 19), a limit switch LS2, on the left lower track in the housing extension 15, is closed by a previously loaded cage travelling rearward along that track shortly before the following cage reaches load-unload position. Assuming the elevator to be in lowered position the leading basket on the conveyor 116 rolls from position B thereon to position A on the elevator table 118. It is stopped by the frame of a loading table 119 having a roller top 120 inclined downwardly toward the left as viewed in FIGURE 2. As the basket rolls from position B to position A it closes limit switch LS1. Closing of the limit switches LS1 and LS2 activates air valve AV1 up and the elevator rises permitting opening of the normally closed contact of switch LS3. Activation of the air valve AV1 up is effective for raising the elevator table 117 to the level of the roller top or platform 120 of the loading table. As the elevator starts upward it releases one end of a stop 121 pivoted at its other end, at 122, between the side rails of the conveyor 116. The stop 121 is yieldingly urged upward by compression spring means 123 confined between the stop and a bracket 124 secured to the undersurface of the side rails of conveyor 16. Stop 121 is provided with a stop finger 125' disposed to be projected upward between and above two of the rollers of conveyor 116 when the stop 121 is moved upward. As will be understood, finger 125' is disposed to project into the path of a leading basket in position B on the conveyor 116 held against movement thereon by a basket which has passed onto the table 117 of the elevator 118 and, in the upward movement of the conveyor, finger 125 moves upward to position to hold the basket on the conveyor 116 in position B thereon in such position.

The switches previously mentioned, and those hereinafter referred to, are of known type, frequently referred to as micro-switches. The air valves herein referred to are also of known type, being preferably "MAC" four way valves made by Mechanical Air Controls Inc. of Detroit, Mich., and neither the switches nor the air valves require detailed description.

When elevator 118 reaches its top position, the basket thereon rolls onto the load platform 120 to position C thereon, against a suitable stop and closes a pick-up switch PS1, closing of which is effective for activating the solenoid air valve AV1 down, LS3 being now closed, through LS4, also now closed, PS1 and LS3, now also closed, returning the elevator to lowered position for reception of another basket and opening the switch LS3.

The closing of LS4 and PS1 also actuates a solenoid air valve AV2 in causing the piston rod 127 of an air cylinder pusher 125, mounted in front of the loading platform 120, to be projected. The pusher is effective for pushing the basket from the platform 120 into the cage now stopped at the load-unload position. When the pusher has pushed the basket into the cage, an element on the pusher head closes a normally open switch LS9. Closing of LS9 actuates a solenoid air valve AV2 out effective for returning the piston rod of the pusher to its normal retracted position, in which the head of the pusher holds switch LS10 closed, as a safety feature. Shortly thereafter the timer times out and the conveyor advances a further step bringing a succeeding cage to load-unload position. As the loaded cage moves downwardly away from load-unload position the locking arms 47 pass beyond the cams 114 and are moved to locking position by the tension springs 51, with the locking rods 49 seating on the stems of the T-handles 95 of the basket, between the sides thereof and the heads of the handles, effective for locking the basket in the cage.

Also, in the downward travel of the loaded cage, arm 108 of the latch lever 106 passes out of contact with cam 109 and the latch member 105 is returned to latching position by the tension spring 110. The cage rotating gear 101 is then latched in either its outer non-rotate position or its inner rotate position, as the case may be and as will appear more fully presently.

The head 126 of pusher 125, secured on the outer end of piston rod 127 thereof, is disposed to contact basket 79 at the lower portion thereof, below the handle 95 at that side of the basket. The forward portion of platform 45 of cage 38, when the latter is in load-unload position, is inclined downwardly and forwardly, to facilitate entry of the basket. As the basket is pushed into the cage the end guide strips 93 and 94 thereof receive between them the basket guide strips 46, which position the basket within the cage and also, in conjunction with the locking rods 49 and handles 95 restrain it against movement away from the platform 45.

A light source 128 is mounted a short distance in rear of the load-unload position of a cage and is disposed to direct a beam of light into a photoelectric cell 129 also disposed a short distance in back of the cage. The light source 128 is disposed adjacent the lower inner corner of a cage in load-unload position and the photoelectric cell 120 is disposed adjacent the upper inner corner of the cage, so that the light beam extends diagonally of the cage from the lower right corner thereof, as viewed from in front, to its inner upper left corner. In the event the pusher 125 pushes a basket beyond the back of the cage the light beam will be interrupted and the normally closed switch PES1 controlled by the photoelectric cell 129 will open thus opening the motor circuit and preventing resumption of operation of the conveyor when the timer times out. That is a safety feature guarding against resumption of operation of the conveyor until a basket pushed too far into the cage has been properly positioned therein, as will be understood. Assuming that the basket is properly positioned within the cage by the pusher, the conveyor resumes operation and advances another step, at the expiration of the dwell time.

As the loaded basket is pushed into the cage it pushes therefrom, onto a downwardly and inwardly inclined unloading roller table 131 a basket of parts which have been degreased and cleaned. As the latter basket travels downwardly over table 131 it actuates limit switch LS14, connected in series with switches LS8 and LS10 and a control relay CR2. In the event the discharged basket does not travel beyond the switch LS14 the latter is held open and the relay CR2 is effective for opening the motor circuit and thereby preventing resumption of operation of the conveyor when the timer times out, until the difficulty has been remedied. It should be here noted that interruption of the light beam across the inner side or back of the cage by the discharge basket occurs only during the dwell time of the cage at the load-unload position so that if a basket being loaded into the cage is pushed too far so as to interrupt the light beam, resumption of operation of the conveyor when the timer times out will be prevented, as above explained.

Normally a basket pushed from the cage will travel down the roller unloading table 131 into contact with a stop in the form of an angle bracket 132. An air cylinder 133 is fixedly mounted on the bracket 132 and has a piston rod extending through its righthand end, as viewed from in front. The piston rod 134 of air cylinder 133 is secured by an arm 135 to the right hand end of a sleeve 136 slidable on a guide rod 137 mounted in bracket 132 and disposed in overlying parallel relation to air cylinder 133 and piston rod 134 thereof. The sleeve 136 is provided with an arm 138 fixed on its left hand end and extending forwardly over the unloading table 131. As the discharged basket reaches the bracket 132 it closes a normally open position switch PS2 which actuates air valve AV3 controlling the discharge air cylinder 133. The piston rod 134 of that cylinder is then projected and arm 135 pulls the basket from the unloading table 131 onto a downwardly and outwardly inclined roller discharge conveyor 139. The basket rolls downwardly along the conveyor 139 from which it may be removed manually or in any suitable manner. As the piston rod 134 of the unload cylinder 133 reaches the limit of its out stroke, arm 135 closes limit switch LS12 thereby actuating air valve AV3 return, effective for returning the piston rod to its normally retracted position. If the piston rod 134 of cylinder 133 fails to return to fully retracted position, the limit switch LS13, normally held closed by arm 138, remains open. In such event, shortly after the incomplete in stroke of piston rod 134, a loaded cage leaving the load-unload station opens the normally closed limit switch LS15, disposed slightly rearward of the sprocket 18 adjacent the left side of the housing extension 15. Opening of switch LS15 actuates control relay CR1, which stops the conveyor in order that the difficulty may be remedied. If the piston rod 134 of cylinder 133 is returned to its fully retracted position the switch LS13 is held closed by arm 138 and the opening of switch LS15 is then ineffective for stopping the conveyor.

The basket 79 should be securely locked in the cage 38 by the locking bars 49, for obvious reasons. If for any reason either of the locking arms 47 is not returned to full locking position by its associated tension spring 51 as it passes beyond the cam 114, the rearward lower end of such locking arm will contact the corresponding one of two trip levers 140 and 141 pivoted at 142 on the frame 119 of the loading platform 120. Referring to FIGURES 9 and 19; each of the levers 140 and 141 normally is held in horizontal position, in contact with a stop 143 secured to a bracket 144 and adjustably mounted on stand 119, by a tension spring 145 anchored at its upper end to the lever and at its lower end to the bracket structure 144. In the normal position of the levers 140 and 141 the inner or rearward arms thereof extend into the path of travel of the forward lower ends of the locking arms of a cage 38 travelling downward toward the sprocket wheels 18, when the arms 47 are in releasing position. The forward upper end of each lever 140 and 141 is rounded at 146 and contacts a roller 147 at the inner of an operating arm 148 of a limit switch, such as switch LS17. That switch is actuated by arm 140 and a similar switch LS18 is actuated by the arm 141, as will be understood. The two switches LS17 and LS18 both are normally closed.

In the event either of the locking arms 47 is in releasing position, or has not been returned to full locking position, as the cage moves downward toward the sprockets 18 one of the switches LS17 and LS18, or both thereof, will be opened effective for energizing a control relay CR1 thereby opening the motor circuit and stopping the conveyor until the difficulty can be remedied. As will be understood, when the trip levers 140 and 141 are in their normal position, the rearward ends thereof are disposed to clear the locking arms 47 of the cage 38 as the latter starts its travel about the sprockets 18, so that no interruption in operation of the conveyor occurs if the locking arms of the cage are not out of their proper locking position.

Referring further to FIGURES 7, 16, 17 and 18, as a cage reaches load-unload position the cage rotating gear 101 is unlatched from the bracket 100 and, if in its outer non-rotate position is cammed inward to its inner rotate position, as above explained. If it is desired to rotate the cage, the gear 101 remains in its inner rotate position as the cage leaves the load-unload station and is shortly thereafter latched in such position. Thereafter during travel of the cage through the housing 1 the gear 101 engages with arcuate rack bars 150 extending about the sprockets 22, 24 and 26 and into the corresponding sumps 10, 11 and 12. Accordingly, the cage is rotated during its travel through the sumps. After the cage leaves the rearward sump 26 the gear 101 meshes with a vertical rack bar 151 extending into the stack 3. The cage then passes about the sprockets 27 onto the upper horizontal tracks previously mentioned.

During travel of the cage along the latter tracks, the gear 101 meshes with the horizontal rack bar 152 overlying the upper tracks and terminating at the supplementary housing 5. The rack bars 150, 151 and 152 are disposed at the left side of the housing and are spaced inward from the main load supporting tracks for the cage, as will be understood. During passage of the cage through the housing the guide means previously described assures that it will be in substantially upright position as it enters into and passes from each of the sumps and will also be insubstantially upright position in its travel from the sprockets 27 to the sprockets 16 at which the rollers and guide means on the cage enter between the vertical guide rails cooperating therewith for maintaining the cage in upright position during its travel to load-unload position.

The guide means adjacent the sumps are so formed and disposed as not to interfere with rotation of the cage in the manner above stated while guarding against excessive swaying or swinging of the cage as it passes from one sump to another and assuring that as it enters each of the sumps it will be in substantially upright position. When it is desired to rotate the cage, the selector 96 at the left end of the basket 79, as viewed on the load table or platform 120, is in its broken line position shown in FIGURE 13 with its horizontal flange resting on the horizontal flange of the upper guide strip 93.

When it is not desired to rotate the cage, the selector 96 is turned to its full line position with its horizontal flange disposed above the upper guide strip 93, it being noted that the end portion of that flange is beveled at 98 at the area thereof remote from the pivot 97. With the selector 96 in its latter position, as the basket is pushed into the cage the selector actuator limit switch LS6 which normally is open. Closing of LS6 actuates air valve AV4 of a gear shift air cylinder 154 mounted at the left side of the housing 1. That is effective for retracting piston rod 155 of cylinder 154. The piston rod 154 is provided at its inner end with an arm 156 which extends across the inner face of gear 101 and is disposed to clear the latter in the downward travel of the cage 38.

Retraction of piston rod 155 pulls gear 101 outward to its non-rotate position, it being recalled that the latch member 105 is then in its releasing position. When the basket has been pushed completely into the cage piston rod 127 of air cylinder 125 is retracted, as previously described. As the piston rod 155 of cylinder 154 reaches the end of its out stroke it closes a normally open limit switch LS7 which actuates air valve "AV4 return" effective for returning the piston rod 155 to its normal inner or projected position while leaving the gear 101 in its outer non-rotate position. That occurs while the cage is stationary at the load-unload position.

If the piston rod 155 fails to return to its fully projected position, limit switch LS7 remains open, with LS4 also open, and prevents resumption of operation of the conveyor when the timer times out, as a safety feature. Assuming that piston rod 155 returns to its fully projected position, shortly thereafter the dwell timer times out and the conveyor resumes travel. The latch lever 108 then passes out of contact with the release cam and latch member 105 is returned to latching position with the outer or left arm thereof projecting upward at the inner face of block 102 effective for holding gear 101 in its outer non-rotate position.

Thereafter, in the travel of the cage through the housing it will not be rotated and will remain in substantially upright position. As will be understood from the above, the operation of the degreaser is automatic except as to the placing of the baskets on the feed conveyor and the removal thereof from the discharge conveyor, and the cages with the loaded baskets therein may be rotated or not at the option of the operator and as conditions may require.

As above indicated, changes in detail may be resorted to without departing from the field and scope of my invention, and I intend to include all such variations, as fall within the scope of the appended claims, in this application in which the preferred form only of my invention has been disclosed.

I claim:

1. In a machine for degreasing articles, an inclined roller top loading table, a roller top unloading table inclined downwardly away from said loading table, a roller top discharge conveyor leading from said unloading table and inclined downwardly therefrom, a loading and unloading station between said tables, an endless conveyor travelling past said station, uniformly spaced cages mounted on said conveyor, cage activated means for automatically stopping the conveyor with a cage at said station for a predetermined period of time and for advancing it a distance corresponding to the spacing of said cages at the expiration of such time period, said cages being adapted for reception of article containing baskets, an elevator adjacent said loading station and normally in lowered position, said elevator having a roller top inclined downward toward said loading table, a roller feed conveyor inclined downwardly to said top of said elevator in the normal lowered position of the latter, elevator controlled means for delivering baskets singly from said feed conveyor to said elevator, cage and elevator actuated means for raising said elevator and delivering a basket therefrom to said loading table and then returning said elevator to its normal lowered position, means actuated by a basket delivered to said loading table and effective for pushing a basket therefrom into a cage at said station and thereby pushing from said cage a basket onto said unloading table, and means actuated by a basket pushed onto said unloading table and effective for delivering said basket from said unloading table to said discharge conveyor.

2. In a machine for degreasing articles, a housing having in its lower portion a sump for a degreasing solvent liquid, a load-unload station adjacent one end of said housing, an endless conveyor travelling past said station and through said sump, a plurality of uniformly spaced cages mounted on said conveyor, means for automatically stopping the conveyor for a predetermined time period with a cage at said station in upright loading position and for advancing the conveyor a distance corresponding to the spacing of said cages at the expiration of said time period, and cooperating guide means on said cages and in said housing effective for returning said cages to substantially upright position as they enter and leave said sump and in their continued travel to said station.

3. A machine for degreasing articles according to claim 1 wherein there is means for rotating said carriers incident to travel of said conveyor, and means effective for optionally enabling and disabling said rotating means.

4. A machine for degreasing articles according to claim 1, wherein the machine has a housing with a sump for a degreasing solvent liquid, said conveyor travelling past said station and through said sump.

5. A machine for degreasing articles according to claim 1, wherein there is means for rotating the carriers incident to travel of the conveyor, means effective for optionally enabling and disabling said rotating means, the machine having a housing with a sump for a degreasing solvent liquid, said conveyor travelling past said station and through said sump.

6. In a machine for degreasing articles, a housing with a sump for a degreasing solvent liquid, a loading station, an endless conveyor travelling past said station and through said sump, uniformly spaced carrier cages mounted on said conveyor, means for automatically stopping the conveyor with a cage at said station for a predetermined period of time and for advancing it a distance corresponding to the spacing of said cages at the expiration of such time period, said cages being adapted for reception of article containing baskets, and means for automatically loading a basket into a cage at said station.

7. In a machine for degreasing articles, a housing with a sump for a degreasing solvent liquid, a loading station, an endless conveyor travelling past said station and through said sump, uniformly spaced carrier cages rotatably mounted on said conveyor, means for rotating said carrier cages incident to travel of said carrier, means effective for optionally enabling and disabling said rotating means, means for automatically stopping the conveyor with a cage at said station for a predetermined period of time and for advancing it a distance corresponding to the spacing of said cages at the expiration of such time period, said cages being adapted for reception of article containing baskets, and means for automatically loading a basket into a cage at said station.

References Cited by the Examiner
UNITED STATES PATENTS

| | | | |
|---|---|---|---|
| 2,963,140 | 12/1960 | Barton | 198—19 |
| 2,987,201 | 6/1961 | Abbey | 198—19 X |
| 3,133,622 | 5/1964 | Immesberger | 198—19 X |

EVON C. BLUNK, *Primary Examiner.*

A. C. HODGSON, *Assistant Examiner.*